(12) United States Patent
Broyde et al.

(10) Patent No.: US 7,884,648 B2
(45) Date of Patent: Feb. 8, 2011

(54) PSEUDO-DIFFERENTIAL INTERFACING DEVICE HAVING A SWITCHING CIRCUIT

(75) Inventors: Frédéric Broyde, Maule (FR); Evelyne Clavelier, Maule (FR)

(73) Assignee: Excem SAS, Maule (FR)

( * ) Notice: Subject to any disclaimer, the term of this patent is extended or adjusted under 35 U.S.C. 154(b) by 0 days.

(21) Appl. No.: 12/599,114

(22) PCT Filed: May 20, 2008

(86) PCT No.: PCT/IB2008/051982

§ 371 (c)(1),
(2), (4) Date: Nov. 6, 2009

(87) PCT Pub. No.: WO2009/007866

PCT Pub. Date: Jan. 15, 2009

(65) Prior Publication Data

US 2010/0213971 A1    Aug. 26, 2010

(30) Foreign Application Priority Data

Jul. 9, 2007 (FR) .................................. 07 04949

(51) Int. Cl.
*H03K 19/0175* (2006.01)
(52) U.S. Cl. .......................................... 326/86; 326/82
(58) Field of Classification Search .................... 326/30, 326/82–87
See application file for complete search history.

(56) References Cited

U.S. PATENT DOCUMENTS

| 5,638,322 A | 6/1997 | Lacey |
| 5,818,261 A | 10/1998 | Perner |
| 5,994,925 A | 11/1999 | Sessions |
| 6,025,742 A * | 2/2000 | Chan .......................... 327/108 |

(Continued)

FOREIGN PATENT DOCUMENTS

EP    0836274    4/1998

(Continued)

OTHER PUBLICATIONS

International Search Report for International Application No. PCT/IB2008/051982, dated Jul. 11, 2008.

(Continued)

*Primary Examiner*—Rexford N Barnie
*Assistant Examiner*—Thienvu V Tran
(74) *Attorney, Agent, or Firm*—Barnes & Thornburg LLP

(57) ABSTRACT

The invention relates to an interfacing device for pseudo-differential transmission through interconnections used for sending a plurality of electrical signals. The interfacing device of the invention includes signal terminals and a common terminal. A transmitting circuit receives the input signals of the transmitting circuit coming from a source. The output of the transmitting circuit delivers, when the transmitting circuit is in the activated state, voltages between one of the signal terminals and the reference terminal (ground). A receiving circuit delivers, when the receiving circuit is in the activated state, output signals of the receiving circuit determined each by the voltage between one of the signal terminals and the common terminal, to the destination. In the closed state, the common terminal switching circuit is, for the common terminal, equivalent to a voltage source delivering a constant voltage, connected in series with a passive two-terminal circuit element presenting a low impedance.

11 Claims, 8 Drawing Sheets

U.S. PATENT DOCUMENTS

| | | | |
|---|---|---|---|
| 6,166,570 A | 12/2000 | Hedberg | |
| 6,195,395 B1 | 2/2001 | Frodsham | |
| 6,768,346 B2 * | 7/2004 | Takekuma et al. | 326/101 |
| 7,099,395 B1 | 8/2006 | Sidiropoulos et al. | |
| 7,362,130 B2 * | 4/2008 | Broyde et al. | 326/30 |
| 2001/0005146 A1 * | 6/2001 | Takekuma et al. | 326/30 |
| 2006/0267633 A1 | 11/2006 | King | |
| 2007/0117446 A1 | 5/2007 | Broyde et al. | |

FOREIGN PATENT DOCUMENTS

| | | |
|---|---|---|
| EP | 1030450 | 8/2000 |
| FR | 2849728 A1 | 7/2004 |

OTHER PUBLICATIONS

Bainbridge W J et al: "Delay insensitive system-on-chip interconnect using 1-of-4 data encoding" Asynchronus Circuits and Systems, 2001. ASYNC 2001. Seventh International Symposium on Mar. 11-14, 2001, Piscataway, NJ, USA, IEEE, Mar. 11, 2001, pp. 118-126, XP010537930, ISBN: 0-7695-1034-5, * Sections 1 and 3 *, abstract; figure 1.

* cited by examiner

PSEUDO-DIFFERENTIAL INTERFACING DEVICE HAVING A SWITCHING CIRCUIT

CROSS-REFERENCE TO RELATED APPLICATIONS

The present application claims the benefit of priority to International Patent Application No. PCT/IB2008/051982 filed 20 May 2008, which further claims the benefit of priority to France Patent Application No. 0704949 filed 09 Jul. 2007, the contents of which are incorporated herein by reference in their entirety.

FIELD OF THE INVENTION

The invention relates to an interfacing device for pseudo-differential transmission through interconnections used for sending a plurality of electrical signals, such as the interconnections made with multiconductor cables, or with the traces of a printed circuit board, or inside an integrated circuit.

The French patent application Ser. No. 07/04949 of 9 Jul. 2007, entitled "Dispositif d'interface pseudo-différentiel avec circuit de commutation" is incorporated by reference.

PRIOR ART

Let us consider the problem of transmission through an interconnection, for obtaining m transmission channels, m being an integer greater than or equal to 2. Each transmission channel may be used for transmitting signals of any type, for instance analog signals or digital signals, from a source to a destination. We consider here that a digital signal is a signal whose value is defined only at discrete points in time, the set of the values that the signal may take on being discrete. We consider also that each value of a digital signal corresponds to a voltage or current interval. This definition of a digital signal as a "digital signal defined by voltage or current intervals" includes:
 the binary signals used in binary signaling, that is to say any signal such that, in each transmission channel, the set of the values that this signal may take on has 2 elements;
 the N-ary signals (N being an integer greater than or equal to 3) used in multilevel signaling, that is to say any signal such that, in each transmission channel, the set of the values that this signal may take on has N elements.

Binary signals are the signals which are the most frequently used today by digital integrated circuits, for instance the integrated circuits of the HCMOS family, which is well known to specialists. Multilevel signals, for instance quaternary signals (sometimes referred to as PAM-4 or 4-PAM), are used to obtain high bit rates. The use of such multilevel signals is for instance discussed in the article of J. L. Zerbe et al entitled "1.6 Gb/s/pin 4-PAM Signaling and Circuits for a Multidrop Bus", published in the *IEEE Journal of Solid-State Circuits*, vol. 36, No. 5, in May 2001.

We will consider that any signal which does not comply with this definition of a digital signal is an analog signal. Consequently, the result of any type of modulation of a carrier by a digital signal will be regarded as an analog signal.

The simplest transmission scheme for obtaining m transmission channels uses m single-ended links. Using m single-ended links, each transmission channel uses one transmission conductor of the interconnection, and the reference conductor (ground) is used for the return current produced by the currents flowing on the m transmission conductors. This scheme is vulnerable to the noise produced by some electromagnetic couplings between some conductors of said interconnection and other nearby conductors, for instance when said interconnection and these other conductors are built on the same printed circuit board.

However, there are transmission schemes intended to provide a good protection against the noise produced by unwanted electromagnetic couplings: differential links (see for instance the book of H. W. Johnson and M. Graham entitled *High-speed digital design: a handbook of black magic*, published by Prentice Hall PTR in 1993), and pseudo-differential links (see for instance the section II of the paper of A. Carusone, K. Farzan and D. A. Johns entitled "Differential signaling with a reduced number of signal paths" published in *IEEE Trans. Circuits Syst. II*, vol. 48, No. 3, pp. 294-300 in March 2001 and the section 4.2.3 of the book of F. Yuan entitled *CMOS current-mode circuits for data communications*, published by Springer in 2007).

A differential system for transmission providing m transmission channels uses an interconnection having 2m transmission conductors. A pseudo-differential system for transmission providing m transmission channels uses an interconnection having m transmission conductors and a common conductor distinct from the reference conductor (ground).

Interfacing devices for pseudo-differential transmission are for instance described in the patent of the U.S. Pat. No. 5,818,261 entitled "Pseudo-differential bus driver/receiver for field programmable devices", in the patent of the U.S. Pat. No. 5,994,925 entitled "Pseudo-differential logic receiver", in the patent of the U.S. Pat. No. 6,195,395 entitled "Multi-agent pseudo-differential signaling scheme" and in the patent of the U.S. Pat. No. 7,099,395 entitled "Reducing coupled noise in pseudo-differential signaling".

It should be noted that the wording "pseudo-differential" is also applied to devices which are not related in any way to pseudo-differential transmission. For instance, the patent application number US 2006/0267633 of the United States of America entitled "Pseudo-differential output driver with high immunity to noise and jitter" relates to a device having one differential input channel and one single-ended output channel: this device is not related to pseudo-differential transmission in any way. For instance, the U.S. Pat. No. 5,638,322 of the United States of America entitled "Apparatus and method for improving common mode noise rejection in pseudo-differential sense amplifiers" relates to sense amplifiers which to some extent look like conventional differential amplifiers: this invention is not related to pseudo-differential transmission in any way.

Two pseudo-differential systems for transmission each providing m=4 transmission channels are shown in FIG. 1 and in FIG. 2, these systems each comprising:
 an interconnection (1) having m=4 transmission conductors (11) (12) (13) (14) plus a common conductor (10) distinct from the reference conductor (7);
 a transmitting circuit (5) receiving at its input the signals of the 4 channels of the source (2);
 a receiving circuit (6) having its output connected to the destination (3).

The transmitting circuit (5) receives at its input the signals of the 4 channels of the source (2), and its 5 output terminals are connected to the m+1=5 conductors of the interconnection (1), one of these conductors being the common conductor (10). The receiving circuit (6) has its 5 input terminals connected to the conductors of the interconnection (1), one of these conductors being the common conductor (10). The receiving circuit (6) produces voltages at its output terminals connected to the destination (3), each of these voltages being determined by one and only one of the voltages between one of the transmission conductors and the common conductor. The systems shown in FIGS. 1 and 2 provide 4 transmission channels, such that the signals of the 4 channels of a source (2) are sent to the 4 channels of the destination (3).

In the FIGS. 1 and 2, we find a termination (4), as in said patent of the U.S. Pat. No. 6,195,395. In the case of FIG. 1, the termination (4) is made of m=4 resistors (401) (402) (403) (404) each connected between a transmission conductor and ground. In the case of FIG. 2, the termination (4) is made of m+1=5 resistors, m=4 resistors (401) (402) (403) (404) being connected as in FIG. 1, and a resistor (410) being connected between the common conductor (10) and the reference conductor (7).

In FIGS. 1 and 2, instead of being connected to ground, the resistors of the termination (4) could be connected to a node intended to present a fixed voltage with respect to ground, for instance a power supply voltage. This technique is for instance used in the pseudo-differential signaling scheme using integrated circuits of the Gunning Transceiver Logic (GTL) family, which is well known to specialists. Each resistor connected to a conductor of the interconnection (1) could also be replaced with another known type of termination (see for instance the chapter 6 of the above-mentioned book of H. W. Johnson and M. Graham), for instance a split termination (also referred to as "Thevenin termination") comprising 2 resistors, the first resistor being inserted between this conductor of the interconnection and ground, the second resistor being inserted between this conductor of the interconnection and a node presenting a fixed voltage with respect to ground.

As explained in said patents of the U.S. Pat. No. 5,818,261, U.S. Pat. No. 5,994,925, U.S. Pat. No. 6,195,395 and U.S. Pat. No. 7,099,395, the common conductor is mainly used to provide a fixed reference voltage and is not used for the transmission of signals in said m transmission channels.

Consequently, when the transmitting circuit sends signals, the currents injected in the transmission conductors are associated with return currents flowing mainly in the reference conductor or in a power supply conductor. The specialist understands that this situation often creates unwanted couplings with other electronic circuits near the interconnection.

The specialists understand that the terminations (4) of FIGS. 1 and 2 are used for reducing reflections, and that such terminations produce return currents flowing mainly in the reference conductor or in a power supply conductor. Consequently, these terminations increase the generation of electromagnetic disturbances which may degrade the performances of nearby circuits, and the vulnerability to electromagnetic disturbances produced by nearby circuits.

The French patent application Ser. No. 07/04421 of 21 Jun. 2007, entitled "Dispositif d'interface pseudo-différentiel avec circuit de terminaison" and the international application number PCT/IB2008/051826 of 8 May 2008, entitled "Pseudo-differential interfacing device having a termination circuit", describe terminations which do not produce return currents flowing mainly in the reference conductor or in a power supply conductor. Such terminations may therefore be used to improve pseudo-differential transmission. However, prior art transmitting circuits for pseudo-differential transmission nevertheless produce return currents flowing mainly in the reference conductor or in a power supply conductor. Consequently, because of the limitations of these prior art transmitting circuits, prior art pseudo-differential systems for transmission generate electromagnetic disturbances which may degrade the performances of nearby circuits, and are vulnerable to electromagnetic disturbances produced by nearby circuits.

DESCRIPTION OF THE INVENTION

It is an object of the interfacing device of the invention to provide pseudo-differential transmission through an interconnection having two or more transmission conductors, the transmission presenting reduced unwanted couplings.

The invention is about a device for transmitting signals through a plurality of transmission channels, in a known frequency band, comprising:

m signal terminals, a common terminal and a reference terminal (ground), the signal terminals and the common terminal being intended to be connected to an interconnection having at least m+1 conductors, m being an integer greater than or equal to 2, said common terminal being not connected to said reference terminal;

a receiving circuit delivering, when the receiving circuit is in the activated state, p "output signals of the receiving circuit" corresponding each to a transmission channel, p being an integer greater than or equal to 1 and less than or equal to m, the input of the receiving circuit being coupled to at least p of said signal terminals and to said common terminal, each of said "output signals of the receiving circuit" being mainly determined by the voltage between one and only one of said signal terminals and said common terminal;

a transmitting circuit receiving q "input signals of the transmitting circuit" corresponding each to a transmission channel, q being an integer greater than or equal to 2 and less than or equal to m, the output of the transmitting circuit being coupled to at least q of said signal terminals, the output of the transmitting circuit delivering, when the transmitting circuit is in the activated state, q transmission variables, each transmission variable being either a voltage between one of said signal terminals and said reference terminal or a current flowing out of one of said signal terminals, each transmission variable being mainly determined by one and only one of said "input signals of the transmitting circuit"; and a common terminal switching circuit having an open state and a closed state, the common terminal switching circuit having a return current terminal connected to said common terminal, the common terminal switching circuit being in the closed state when the transmitting circuit is in the activated state, the common terminal switching circuit being in the open state when the receiving circuit is in the activated state, the common terminal switching circuit in the closed state providing, between said common terminal and said reference terminal, a voltage approximately equal to the sum of a constant voltage and of the voltage, determined using the active sign convention, which would appear across a first passive two-terminal circuit element through which the current flowing from said return current terminal to said common terminal would flow.

According to the invention, the common terminal is not connected to the reference terminal, in agreement with the principle of pseudo-differential transmission. In the following, the wordings "is in the deactivated state" and "is not in the activated state" are equivalent.

According to the invention, said receiving circuit delivers "output signals of the receiving circuit" corresponding each to a transmission channel, when the receiving circuit is in the activated state. According to the invention, there is a deactivated state of the receiving circuit, in which the common terminal switching circuit may be in the closed state.

According to the invention, each transmission variable delivered by said transmitting circuit is determined by one and only one of said "input signals of the transmitting circuit", when the transmitting circuit is in the activated state. According to the invention, there is a deactivated state of the transmitting circuit, in which the common terminal switching circuit may be in the open state.

Consequently, according to the invention, said receiving circuit and said transmitting circuit cannot be simultaneously in the activated state, but said receiving circuit and said transmitting circuit may be simultaneously in the deactivated state. When the receiving circuit is in the activated state, the output of the transmitting circuit in the deactivated state must be such that the voltage between the common terminal and ground may vary (this is necessary for a pseudo-differential link) and such that the voltages between the signal terminals coupled to the input of the receiving circuit and said common terminal may vary. However, there is no similar general requirement relating to the output of the receiving circuit in the deactivated state, according to the definition given above of a device of the invention.

According to the invention, the wording "voltage, determined using the active sign convention, which would appear across a two-terminal circuit element through which the current flowing from said return current terminal to said common terminal would flow" obviously refers to the most general "voltage, determined using the active sign convention, which appears across a two-terminal circuit element subject to the current flowing from said return current terminal to said common terminal", that is to say a voltage which, at each point in time, is solely determined by the history, up to this point in time, of the current flowing from said return current terminal to said common terminal. The specialist understands that this wording does not imply that a two-terminal circuit element subject to the current flowing from said return current terminal to said common terminal is actually present in a device of the invention: the two-terminal circuit element is only used for modeling the voltage between said common terminal and said reference terminal (this voltage being equal to the voltage between said return current terminal and said reference terminal).

According to the invention, said common terminal switching circuit in the closed state behaves approximately, for said common terminal, as a first passive two-terminal circuit element having a first terminal held at a fixed voltage with respect to said reference terminal, and having a second terminal connected to said return current terminal. Said fixed voltage may be positive, negative or zero.

A device of the invention may be such that, in the open state, the common terminal switching circuit provides a current flowing out of said return current terminal approximately equal to zero. However, this is not at all a characteristic of the invention.

A device of the invention may be such that, in the open state, said common terminal switching circuit provides a current flowing from said return current terminal to said common terminal approximately equal to the sum of a constant current and of the current which would flow out of a second passive two-terminal circuit element subject to the voltage between said common terminal and said reference terminal, the product of the absolute value of the small-signal impedance (also referred to as dynamic impedance) of said first passive two-terminal circuit element at a first quiescent operating point, by the absolute value of the small-signal admittance (also referred to as dynamic admittance) of said second passive two-terminal circuit element at a second quiescent operating point being, in at least a part of said known frequency band, less than or equal to $\frac{1}{2}$.

In this case, said common terminal switching circuit in the open state behaves approximately, for said common terminal, as a second passive two-terminal circuit element connected in parallel with a current source delivering a fixed current, this second passive two-terminal circuit element having a first terminal connected to said reference terminal, and having a second terminal connected to said return current terminal. Said fixed current may be positive, negative or zero.

The wording "current which would flow out of a two-terminal circuit element subject to the voltage between said common terminal and said reference terminal" used above obviously refers to the most general "current flowing out of a two-terminal circuit element subject to the voltage between said common terminal and said reference terminal", that is to say a current which, at each point in time, is solely determined by the history, up to this point in time, of the voltage between said common terminal and said reference terminal (this voltage being equal to the voltage between said return current terminal and said reference terminal). The specialist understands that this wording does not imply that a two-terminal circuit element subject to the voltage between said common terminal and said reference terminal is actually present in a device of the invention: the two-terminal circuit element is only used for modeling the current flowing out of said common terminal.

According to the invention, said first two-terminal circuit element used for modeling the common terminal switching circuit in the closed state and said second two-terminal circuit element used for modeling the common terminal switching circuit in the open state are passive two-terminal circuit elements in the meaning of circuit theory (a passive circuit element is a circuit element in which the energy absorbed can only be positive or zero), but these passive two-terminal circuit elements are not necessarily linear.

According to the invention, the common terminal switching circuit in the closed state may be such that, at said first quiescent operating point, said first passive two-terminal circuit element has a small-signal impedance having, in said known frequency band, an absolute value less than or equal to three hundred ohms. The set of the dynamic impedances defined by this inequality is such that, when said transmitting circuit is in the activated state, the currents injected in the transmission conductors may be associated with return currents flowing mainly in the common conductor of said interconnection, which must be connected to said common terminal. The specialist understands that this situation allows reduced unwanted couplings with other electronic circuits near the interconnection.

The above inequality concerning the product of the absolute value of the small-signal impedance of said first passive two-terminal circuit element by the absolute value of the small-signal admittance of said second passive two-terminal circuit element should be applicable to the normal operation of the device of the invention. Consequently:

said first quiescent operating point chosen for determining the small-signal impedance of said first passive two-terminal circuit element should correspond to a quiescent current, flowing out of said return current terminal, which may appear at a given point in time under normal operation, when the common terminal switching circuit is in the closed state;

said second quiescent operating point chosen for determining the small-signal admittance of said second passive two-terminal circuit element should correspond to a quiescent voltage, between said common terminal and said reference terminal, which may appear at a given point in time under normal operation, when the common terminal switching circuit is in the open state.

A device of the invention may also be such that, in the open state, said common terminal switching circuit provides a current flowing out of said return current terminal approximating the sum of a constant current and of the current which would flow out of a second passive two-terminal circuit element subject to the voltage between said common terminal and said reference terminal, the product of the absolute value of the small-signal impedance of said first passive two-terminal circuit element at any quiescent operating point taken in a specified interval of currents flowing out of said return current terminal, by the absolute value of the small-signal admittance of said second passive two-terminal circuit element at any quiescent operating point taken in a specified interval of voltages between said common terminal and said reference terminal being, in at least a part of said known frequency band, less than or equal to ½.

Let us use $v_{C0\ ON}$ to denote said constant voltage and let us use $i_{C0\ OFF}$ to denote said constant current. According to the invention, $v_{C0\ ON}$ may be positive, zero or negative and $i_{C0\ OFF}$ may be positive, zero or negative. Let us use $[i_{C1}, i_{C2}]$ to denote said specified interval of currents flowing out of said return current terminal and let us use $[v_{C1}, v_{C2}]$ to denote said specified interval of voltages between said common terminal and said reference terminal, in the case where these intervals are closed. According to the invention, we may say that, for any frequency f in said part of said known frequency band:

1) for any quiescent operating point $i_{C\ BIAS} \in [i_{C1}, i_{C2}]$ of the common terminal switching circuit in the closed state, we may define a small-signal impedance of said first passive two-terminal circuit element, this small-signal impedance $Z_{ON}(i_{C\ BIAS}, f)$ being in general a complex number;

2) for any quiescent operating point $v_{C\ BIAS} \in [v_{C1}, v_{C2}]$ of the common terminal switching circuit in the open state, we may define a small-signal admittance of said second passive two-terminal circuit element, this small-signal admittance $Y_{OFF}(v_{C\ BIAS}, f)$ being in general a complex number;

3) we may have $$|Z_{ON}(i_{C\ BIAS}, f)||Y_{OFF}(v_{C\ BIAS}, f)| \le \frac{1}{2} \quad (1)$$

In other words, we may have $$\text{either } |Y_{OFF}(v_{C\ BIAS}, f)| = 0 \quad (2)$$

$$\text{or } |Z_{ON}(i_{C\ BIAS}, f)| \le \frac{1}{2|Y_{OFF}(v_{C\ BIAS}, f)|} \quad (3)$$

In a way, we may say that, for the common terminal, in said part of said known frequency band, the absolute value of the dynamic impedance of the common terminal switching circuit in the closed state is less than the half of the absolute value of the dynamic impedance of the common terminal switching circuit in the open state.

According to the invention, when the common terminal switching circuit is in the closed state, the relationship between the current flowing out of said return current terminal and the voltage between said common terminal and said reference terminal may be non-linear. Conversely, according to the invention, when the common terminal switching circuit is in the closed state, the relationship between the current flowing out of said return current terminal and the voltage between said common terminal and said reference terminal may be linear. In this case, we may, at a given frequency f, write $$\text{if } f=0\ v_C - V_{C0\ ON} = -i_C Z_{ON} \quad (4)$$

$$\text{if } f \ne 0\ \underline{v}_C = -\underline{i}_C Z_{ON} \quad (5)$$

where $Z_{ON}$ is the internal impedance of the common terminal switching circuit in the closed state, where the voltage $\underline{v}_C$ is the phasor corresponding to the real voltage $v_C$ which is the voltage between said common terminal and said reference terminal, and where the current $\underline{i}_C$ is the phasor corresponding to the real current $i_C$ which is the current flowing out of said return current terminal.

According to the invention, when the common terminal switching circuit is in the open state, the relationship between the current flowing out of said return current terminal and the voltage between said common terminal and said reference terminal may be non-linear. Conversely, according to the invention, when the common terminal switching circuit is in the open state, the relationship between the current flowing out of said return current terminal and the voltage between said common terminal and said reference terminal may be linear. In this case, we may, at a given frequency f, write $$\text{if } f=0\ i_C - i_{C0\ OFF} = -v_C Y_{OFF} \quad (6)$$

$$\text{if } f \ne 0\ \underline{i}_C = -\underline{v}_C Y_{OFF} \quad (7)$$

where $Y_{OFF}$ is the internal admittance of the common terminal switching circuit in the open state.

We note that the equations (4) to (7) are not restricted to small signals and that they do not refer to a quiescent operating point.

In the case where the equation (1) and the equations (4) to (7) are applicable, for any frequency f in said part of said known frequency band, we note that the equation (1) may be replaced by:

$$|Z_{ON}||Y_{OFF}| \le \frac{1}{2} \quad (8)$$

In this case, we may say that, in a way, for said common terminal:
the common terminal switching circuit in the closed state is equivalent to a network comprising a voltage source delivering a constant voltage connected in series with a first passive linear two-terminal circuit element presenting a "low" impedance;
the common terminal switching circuit in the open state is equivalent to a network comprising a current source delivering a constant current connected in parallel with a second passive linear two-terminal circuit element presenting a "high" impedance.

The specialists understand how they can build a common terminal switching circuit used in the interfacing device of the invention.

A device of the invention may be such that said common terminal switching circuit, said transmitting circuit and said receiving circuit are without any part in common to any two of them. Consequently, a device of the invention may be such that said common terminal switching circuit has no part in common with said transmitting circuit. Conversely, an interfacing device of the invention may be such that said common terminal switching circuit, said transmitting circuit and said receiving circuit are not without any part in common to any two of them. In particular, a device of the invention may be such that said common terminal switching circuit has at least one part in common with said transmitting circuit.

Even in the case of a device of the invention in which said common terminal switching circuit, said transmitting circuit and said receiving circuit are not without any part in common to any two of them, the specialist understands that the functions of the common terminal switching circuit, of the transmitting circuit and of the receiving circuit are distinct. The definition of a device of the invention, this definition being based on the presence of a common terminal switching circuit, of a transmitting circuit and of a receiving circuit, must therefore be understood as a definition relating to functions.

By way of non-limiting example, a device of the invention may be used in such a way that said device of the invention, referred to as "device of the invention A", approximately sees said interconnection and the other devices coupled to said interconnection, in a specified frequency band, when there is no external noise source, as another device of the invention, referred to as "device of the invention B". Obviously, when the transmitting circuit of the "device of the invention A" is in the activated state, the receiving circuit of the "device of the invention B" must be in the activated state, and when the transmitting circuit of the "device of the invention B" is in the activated state, the receiving circuit of the "device of the invention A" must be in the activated state. In the following, this use shall be referred to as "the contemplated use", but "the contemplated use" is only a non-limiting example of a model for a possible use of a device of the invention. In "the contemplated use", assuming that a device of the invention presents, when the receiving circuit is in the activated state, a high impedance between each of said signal terminals and said reference terminal, the specialist understands that:

(a) when the transmitting circuit of the "device of the invention A" and the receiving circuit of the "device of the invention B" are in the activated state, the current flowing in the reference conductor because of the signals sent through the interconnection is low since only one common terminal switching circuit is in the closed state (the common terminal switching circuit of the "device of the invention A");

(b) when the receiving circuit of the "device of the invention A" and the transmitting circuit of the "device of the invention B" are in the activated state, the current flowing in the reference conductor because of the signals sent through the interconnection is low since only one common terminal switching circuit is in the closed state (the common terminal switching circuit of the "device of the invention B").

Consequently, the specialist in electromagnetic compatibility understands that, in "the contemplated use", the object of providing a pseudo-differential transmission presenting reduced unwanted couplings is achieved.

Said interconnection having m+1 conductors may be realized using a cable. Said interconnection may also be realized without using a cable, for instance an interconnection formed in or on a rigid or flexible printed circuit board (using traces and/or copper areas), or an interconnection formed in or on the substrate of a multi-chip module (MCM) or of an hybrid circuit, or an interconnection formed inside a monolithic integrated circuit.

A device of the invention may be such that it constitutes a part of an integrated circuit, said interconnection being realized inside said integrated circuit. In this case, it is possible that said m signal terminals and/or said common terminal are not coupled to pins of said integrated circuit.

A device of the invention may be such that it constitutes a part of an integrated circuit, each of said m signal terminals being coupled to one or more pins of said integrated circuit, said common terminal being coupled to one or more pins of said integrated circuit. This configuration is appropriate when said interconnection is realized outside said integrated circuit. The specialist notes that if there are many signal terminals, for instance more than 16 signal terminals, the absolute value of the current which may flow through the common terminal may become much larger than the maximum absolute value of the current flowing through a single signal terminal. Consequently, in this case, if a single pin is allocated to the common terminal, a degradation of transmission may occur for fast signals, because of the inductance of a connection using a single pin. In this case, using several pins for the common terminal reduces this inductance and improves transmission.

A device of the invention may comprise a termination circuit such as one of the termination circuits described in said French patent application Ser. No. 07/04421 and said international application number PCT/IB2008/051826. Consequently, a device of the invention may comprise a termination circuit coupled to each of said signal terminals and to said common terminal, the termination circuit being, when the termination circuit is in the activated state, approximately equivalent, for said signal terminals and said common terminal, to a network consisting of m branches, each of said branches having a first terminal and a second terminal, each of said branches consisting of a passive two-terminal circuit element connected in series with a voltage source delivering a constant voltage, the first terminal of each of said branches being connected to one and only one of said signal terminals, the second terminal of each of said branches being connected to said common terminal, each of said signal terminals being connected to said first terminal of one and only one of said branches. The termination circuit in the activated state behaves approximately, for said signal terminals and said common terminal, as a network comprising passive two-terminal circuit elements having each a terminal held at a fixed voltage with respect to said common terminal. Said fixed voltage may be positive, negative or zero. Said fixed voltage may be the same for all said terminals held at a fixed voltage. Conversely, said fixed voltage may be different for two or more of said terminals held at a fixed voltage.

In this definition of a termination circuit, it is possible that said passive two-terminal circuit elements may be considered as linear. Consequently, according to the invention, said termination circuit in the activated state may, for said signal terminals and said common terminal, be approximately equivalent to a network consisting of m branches, each of said branches having a first terminal and a second terminal, each of said branches consisting of a passive linear two-terminal circuit element connected in series with a voltage source delivering a constant voltage, the first terminal of each of said branches being connected to one and only one of said signal terminals, the second terminal of each of said branches being connected to said common terminal, each of said signal terminals being connected to said first terminal of one and only one of said branches. Such a termination circuit in the activated state presents, with respect to said common terminal, at any frequency, a diagonal impedance matrix of size m×m. According to the invention, it is possible that there is a deactivated state of the termination circuit, in which the behavior of the termination circuit is different from the one defined above. However, the existence of a deactivated state of the termination circuit is not at all a characteristic of the invention.

An interfacing device of the invention may be such that said termination circuit is made of a network of m resistors, each of said resistors being connected between one of said signal terminals and said common terminal, each of said resistors being connected to a different signal terminal. A termination circuit made of a network of resistors is however not at all a characteristic of the invention. By way of a first example, designers may, in order to reduce the power consumed by the termination circuit, choose to allow the termination circuit to be effective only in a relevant interval of frequencies, for instance by including suitable reactive circuit elements in the termination circuit. By way of a second example, the termination circuit could include active components, for instance insulated gate field-effect transistors (MOSFETs) operating in the ohmic regime. The impedance of the channel of such components may be adjustable by electrical means. Consequently, said termination circuit may be such that the impedance matrix, with respect to said common terminal, of said termination circuit in the activated state can be adjusted by electrical means.

In the same way, according to the invention, said small-signal impedance of said first passive two-terminal circuit element and/or said small-signal admittance of said second passive two-terminal circuit element may be such that they can be adjusted by electrical means.

In the case where the termination circuit has an activated state and a deactivated state, the impedance of the channel of one or more MOSFETs may for instance be controlled by one or more control signals taking on different values in the activated state and in the deactivated state. Consequently, said termination circuit may be such that said termination circuit has an activated state and a deactivated state, the impedance matrix, with respect to said common terminal, of said termination circuit in the activated state being different from the impedance matrix, with respect to said common terminal, of said termination circuit in the deactivated state.

In the case where the termination circuit has an activated state and a deactivated state, components such as transistors may for instance be used as switches having a closed state and an open state. In this case, said transistors may for instance be in the closed state when the termination circuit is in the activated state, and be in the open state when the termination circuit is in the deactivated state. Consequently, said termination circuit may be such that said termination circuit has an activated state and a deactivated state, each current flowing from said termination circuit to one of said signal terminals being substantially zero when said termination circuit is in the deactivated state. Designers may, in order to reduce the power consumed by the termination circuit, choose to put such a termination circuit in the deactivated state when the transmitting circuit is in the activated state. Such a termination circuit may for instance use one of the principles shown in FIGS. 10 and 11 of said French patent application Ser. No. 07/04421 and said international application number PCT/IB2008/051826.

An interfacing device of the invention may be such that said termination circuit has no part in common with said common terminal switching circuit and/or with said transmitting circuit and/or with said receiving circuit. Conversely, an interfacing device of the invention may be such that said termination circuit has one or more parts in common with said common terminal switching circuit and/or with said transmitting circuit and/or with said receiving circuit.

According to the invention, the number m of signal terminals may be equal to the number q of "input signals of the transmitting circuit". In the opposite case, m>q, and the signal terminals which are not allocated to a transmission variable may have another function, for instance providing reference voltages or power feeding.

According to the invention, the number m of signal terminals may be equal to the number p of "output signals of the receiving circuit". In the opposite case, m>p, and the signal terminals which are not used for determining an "output signal of the receiving circuit" may have another function, for instance receiving reference voltages or power feeding. In particular, an interfacing device of the invention may be such that m is greater than or equal to three.

According to the invention, the q "input signals of the transmitting circuit" may for instance be applied to the transmitting circuit using q single-ended links. According to the invention, the q "input signals of the transmitting circuit" may for instance be applied to the transmitting circuit using q differential links. According to the invention, the p "output signals of the receiving circuit" may for instance be delivered using p single-ended links. According to the invention, the p "output signals of the receiving circuit" may for instance be delivered using p differential links.

According to the invention, the transmitting circuit and/or the receiving circuit may have a filtering function, for instance for the purpose of obtaining a pre-emphasis, a de-emphasis or an equalization improving transmission. It then becomes necessary to synthesize the corresponding filters, either as analog filters or as digital filters, using one of the many methods known to specialists.

When losses are not negligible in the interconnection, phase and amplitude distortions may occur, which are referred to as distortions caused by propagation. The reduction of these distortions may be obtained, in a device of the invention, using an equalization reducing the effects of the distortions caused by propagation, said equalization being implemented in said transmitting circuit and/or in said receiving circuit. This type of processing, which is also sometimes referred to as compensation, is well known to specialists, and may be implemented using analog signal processing or digital signal processing. Specialists know that it is commonplace to use adaptive algorithms for implementing this type of processing in receivers for data transmission. A device of the invention may use an adaptive equalization. This type of processing is well known to specialists, and is often implemented using digital signal processing.

BRIEF DESCRIPTION OF THE DRAWINGS

Other advantages and characteristics of the invention will appear more clearly from the following description of particular embodiments of the invention, given by way of non-limiting examples, with reference to the accompanying drawings in which.

DETAILED DESCRIPTION OF SOME EMBODIMENTS

First Embodiment (Best Mode)

Figure 1:
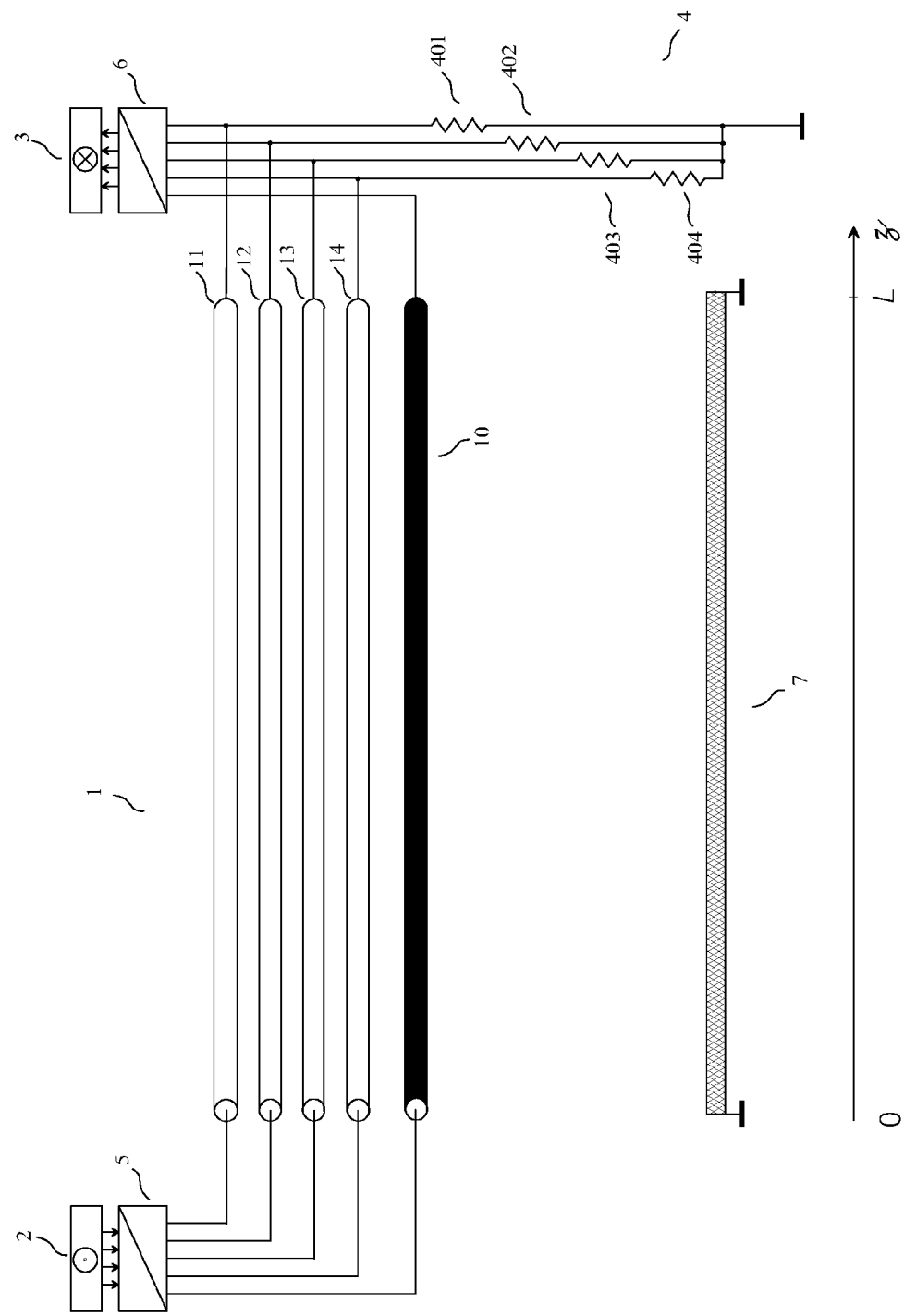
FIG. 1 shows a first pseudo-differential system for transmission comprising an interconnection having four transmission conductors, and has already been discussed in the section dedicated to the presentation of prior art.
Figure 2:
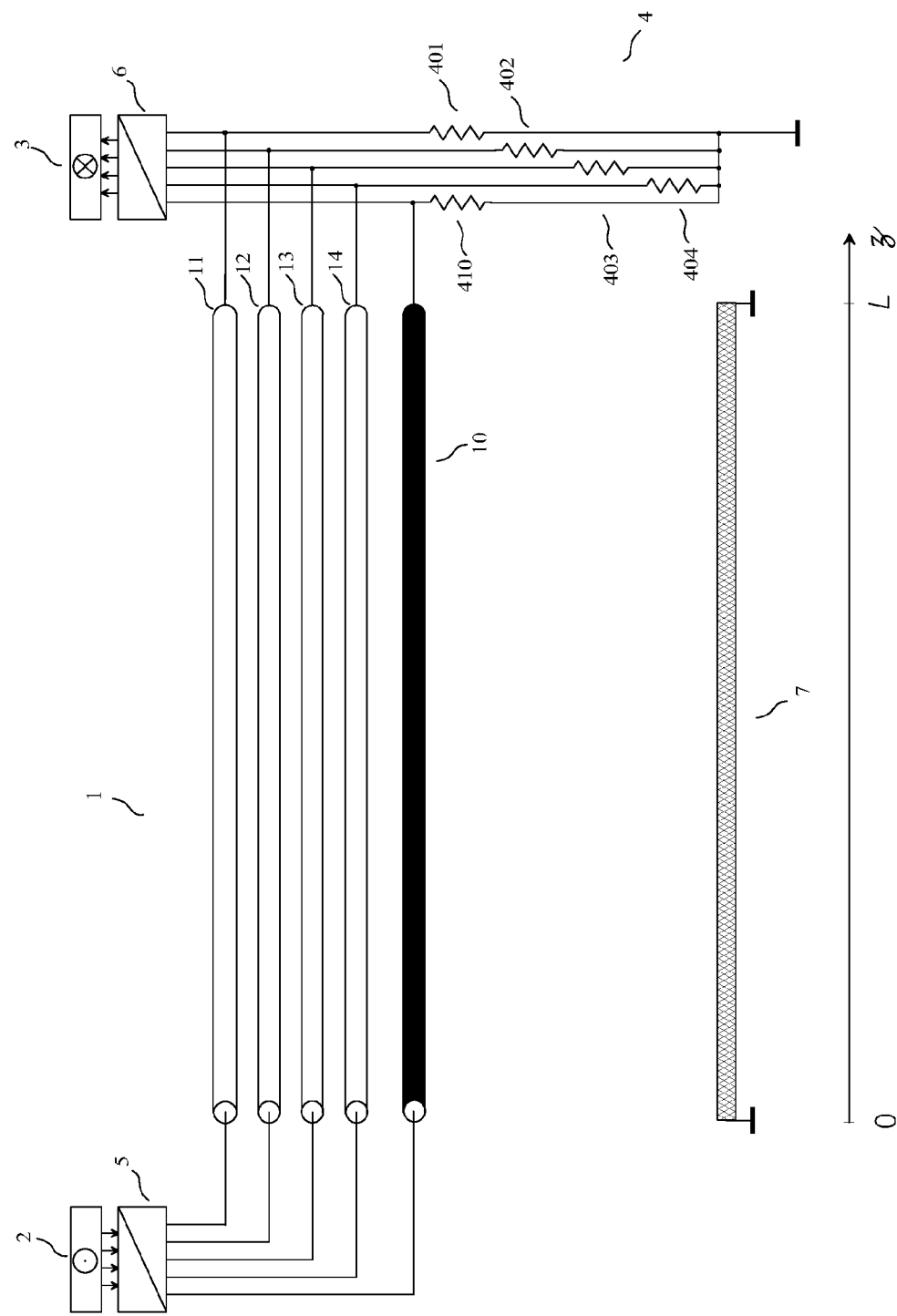
FIG. 2 shows a second pseudo-differential system for transmission comprising an interconnection having four transmission conductors, and has already been discussed in the section dedicated to the presentation of prior art.
Figure 3:
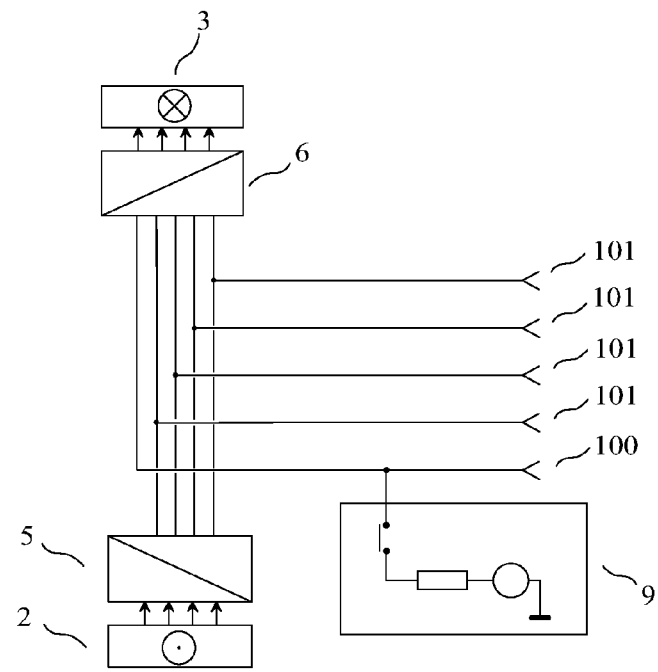
FIG. 3 shows a first embodiment of the invention.

As a first embodiment of an interfacing device of the invention, given by way of non-limiting example and best mode of carrying out the invention, we have represented in FIG. 3 an interfacing device of the invention built inside an integrated circuit, comprising m=4 signal terminals (101) and a common terminal (100), the signal terminals (101) and the common terminal (100) being intended to be connected to an interconnection having at least m+1=5 conductors.

A transmitting circuit (5) receives q=4 "input signals of the transmitting circuit" coming from a source (2), the output of the transmitting circuit being coupled to the 4 signal terminals (101). The output of the transmitting circuit is not coupled to the common terminal (100). The output of the transmitting circuit (5) delivers, when the transmitting circuit is in the activated state, q=4 transmission variables, each transmission variable being a voltage between one of said signal terminals (101) and the reference terminal (ground), each transmission variable being mainly determined by only one of said "input signals of the transmitting circuit". Consequently, when the transmitting circuit (5) is in the activated state, its output presents a low impedance between said signal terminals (101) and said reference terminal. When the transmitting circuit (5) is not in the activated state, its output presents a high impedance, so that the transmitting circuit (5) does not produce transmission variables and only causes a negligible current through the signal terminals (101).

A receiving circuit (6) delivers, when the receiving circuit is in the activated state, p=4 "output signals of the receiving circuit" corresponding each to a transmission channel, the input of the receiving circuit being coupled to the 4 signal terminals (101) and to the common terminal (100), each of said "output signals of the receiving circuit" being determined by the voltage between one of said signal terminals (101) and said common terminal (100). The input of the receiving circuit (6) always presents a high impedance between said signal terminals (101) and said reference terminal. The "output signals of the receiving circuit" are delivered to the destination (3) when the receiving circuit (6) is in the activated state. When the receiving circuit (6) is not in the activated state, its output presents a high impedance, so that the receiving circuit (6) does not deliver any "output signal of the receiving circuit".

The specialists know several suitable methods for producing a high impedance state at the output of the transmitting circuit (5) and at the output of the receiving circuit (6).

In the device of the invention shown in FIG. 3, the receiving circuit (6) and the transmitting circuit (5) cannot be simultaneously in the activated state. The possibility of controlling the activated state of a transmitting circuit and/or of a receiving circuit is usually used in data bus architectures. We note that the circuits needed to control the activated state of the transmitting circuit (5) and of the receiving circuit (6) at a given point in time are not shown in FIG. 3. We also note that the address and/or control lines necessary for coordinating the activated state of the transmitting circuit (5) and of the receiving circuit (6) with the operation of the other entities connected to such a bus are not shown in FIG. 3. These address and/or control lines could be conductors of said interconnection.

The common terminal switching circuit (9) has a return current terminal connected to said common terminal (100). The common terminal switching circuit (9) has an open state and a closed state. The common terminal switching circuit (9) is in the closed state when the transmitting circuit (5) is in the activated state, and is in the open state when the receiving circuit (6) is in the activated state. When the transmitting circuit (5) is in the deactivated state and the receiving circuit (6) is in the deactivated state, the common terminal switching circuit (9) is for instance in the open state.

In the closed state, the common terminal switching circuit (9) provides a voltage $v_C$ between said common terminal (100) and said reference terminal (ground), this voltage $v_C$ approximating the sum of a constant voltage $v_{C0\ ON}$ and of the voltage, determined using the active sign convention, which would appear across a first passive two-terminal circuit element through which the current flowing out of said return current terminal would flow. In other words, in the closed state, the common terminal switching circuit (9) is, for the common terminal (100), equivalent to a network comprising a voltage source delivering a constant voltage $v_{C0\ ON}$, this voltage source having a first terminal connected to ground, this voltage source having a second terminal connected to the first terminal of the first passive two-terminal circuit element, the second terminal of the first passive two-terminal circuit element being connected to said common terminal (100).

In the open state, the common terminal switching circuit (9) provides a current flowing out of said return current terminal approximating the sum of a constant current $i_{C0\ OFF}$ and of the current which would flow out of a second passive two-terminal circuit element subject to the voltage between said common terminal (100) and said reference terminal. In other words, in the open state, the common terminal switching circuit (9) is, for the common terminal (100), equivalent to a network comprising a current source delivering a constant current $i_{C0\ OFF}$, this current source having a first terminal connected to ground, this current source having a second terminal connected to said common terminal (100), this current source being connected in parallel with the second passive two-terminal circuit element.

At any frequency f such that f<1 GHz, the equation (1) is applicable, that is to say: the product of $|Z_{ON}(i_{C\ BIAS}, f)|$ by $|Y_{OFF}(v_{C\ BIAS}, f)|$ is less than or equal to ½.

Figure 4:
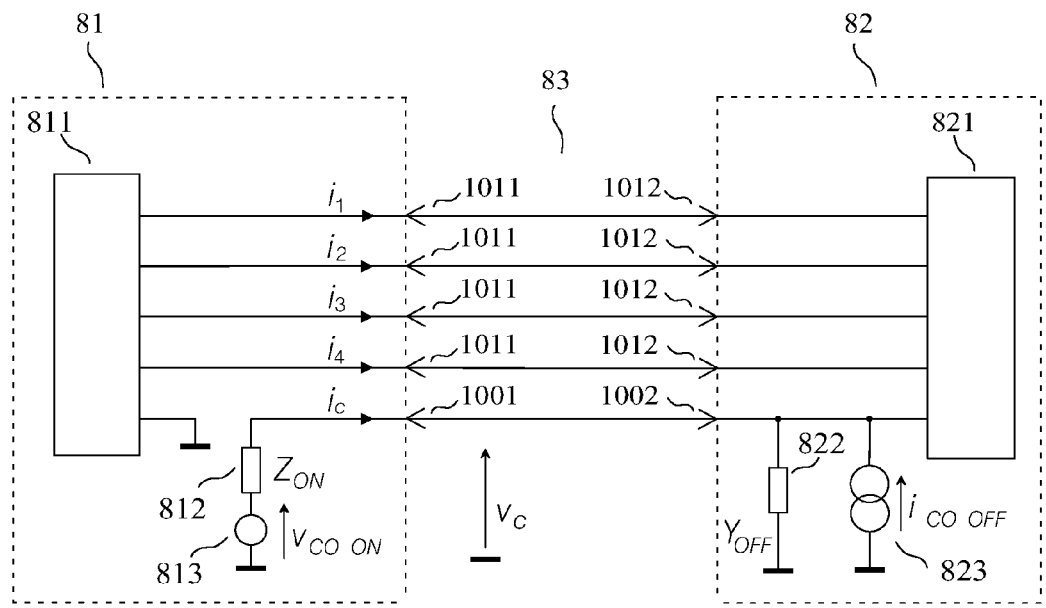
FIG. 4 shows a use of a device of the invention.

Let us consider a use of a "device of the invention A", this use also involving a "device of the invention B" identical to the "device of the invention A" for receiving the transmission variables sent by the "device of the invention A" through said interconnection. We therefore consider the case in which the transmitting circuit of the "device of the invention A" is in the activated state and the receiving circuit of the "device of the invention B" is in the activated state. The FIG. 4 shows an equivalent network (81) for the circuit element having m+2 terminals seen by the left end of the interconnection (83) when the transmitting circuit of the "device of the invention A" is in the activated state. This equivalent network (81) for the "device of the invention A" having its transmitting circuit in the activated state comprises a first isolated circuit (811) having exactly m+1 terminals, a voltage source (813) delivering the constant voltage $v_{C0\ ON}$ and a first passive two-terminal circuit element (812) presenting a dynamic impedance $Z_{ON}(i_{C\ BIAS}, f)$. The first isolated circuit (811) having exactly m+1 terminals has m terminals connected to the signal terminals (1011) of the "device of the invention A", has one terminal connected to ground and presents a low impedance between each of the signal terminals (1011) of the "device of the invention A" and ground. The common terminal (1001) of the "device of the invention A" is connected to the first passive two-terminal circuit element (812) connected in series with the voltage source (813).

The FIG. 4 also shows an equivalent network (82) for the circuit element having m+2 terminals seen by the right end of the interconnection (83) when the receiving circuit of the "device of the invention B" is in the activated state. This equivalent network (82) for the "device of the invention B" having its receiving circuit in the activated state comprises a second isolated circuit (821) having exactly m+1 terminals, a current source (823) delivering the constant current $i_{C0\ OFF}$ and a second passive two-terminal circuit element (822) presenting a dynamic admittance $Y_{OFF}(v_{C\ BIAS}, f)$. The second isolated circuit (821) having exactly m+1 terminals has m terminals connected to the signal terminals (1012) of the "device of the invention B" and has one terminal connected to the common terminal (1002) of the "device of the invention B". The common terminal (1002) of the "device of the invention B" is also connected to the second passive two-terminal circuit element (822) connected in parallel with the current source (823).

According to a first example, in a given frequency band, $|Z_{ON}(i_{C\ BIAS}, f)|<10\Omega$ and $|Y_{OFF}(v_{C\ BIAS}, f)|<100\ \mu S$. Consequently, $|Z_{ON}(i_{C\ BIAS}, f)||Y_{OFF}(v_{C\ BIAS}, f)|<1/1000$. In this first example, the common terminal (1001) of the "device of the invention A" presents a "low" impedance with respect to ground and the common terminal (1002) of the "device of the invention B" presents a "high" impedance with respect to ground.

According to a second example, in a given frequency band, $Z_{ON}(i_{C\ BIAS}, f) \approx 78\Omega$ and $|Y_{OFF}(v_{C\ BIAS}, f)|<120\ \mu S$. Consequently, $|Z_{ON}(i_{C\ BIAS}, f)||Y_{OFF}(v_{C\ BIAS}, f)|<1/100$. In this second example, the common terminal (1002) of the "device of the invention B" presents a "high" impedance with respect to ground and the first passive two-terminal circuit element (812) effectively damps the resonances of the common conductor of the interconnection (83), which links the common terminals (1001) (1002). Here, $Z_{ON}(i_{C\ BIAS}, f)$ is such that the receiving circuit of the "device of the invention B" must effectively reject the influence of the voltage between its common terminal (1002) and ground on the "output signals of the receiving circuit".

According to a third example, in a given frequency band, $|Z_{ON}(i_{C\ BIAS}, f)|<5\Omega$ and $Y_{OFF}(v_{C\ BIAS}, f) \approx 6\ mS$. Consequently, $|Z_{ON}(i_{C\ BIAS}, f)||(v_{C\ BIAS}, f)|<3/100$. In this third example, the common terminal (1001) of the "device of the invention A" presents a "low" impedance with respect to ground and the second passive two-terminal circuit element (822) effectively damps the resonances of the common conductor of the interconnection (83).

The specialists may compare the advantages of these three examples of proportioning of the first passive two-terminal circuit element (812) and of the second passive two-terminal circuit element (812), as a function of the length and of the characteristics of the interconnection (83), and as a function of the considered frequency band.

The specialist understands that, for an accurate modeling of a given use, it would be necessary to describe propagation and couplings in the interconnection (83), for instance using the theory of multiconductor transmission lines to take into account the distributed capacitances and the distributed inductances. The equivalent networks (81) (82) of FIG. 4 for the devices of the invention are also simplified. The equivalent schematic diagram of FIG. 4 is therefore only an approximation.

The specialist understands that a prior art receiver for pseudo-differential signals may be used as a receiving circuit (6) delivering "output signals of the receiving circuit" when the receiving circuit is in the activated state, each of the "output signals of the receiving circuit" being determined by the voltage between one of said signal terminals (101) and said common terminal (100). The specialist understands that a prior art driver for single-ended links may be used as a transmitting circuit (5) delivering transmission variables when the transmitting circuit is in the activated state, each transmission variable being a voltage between one of said signal terminals (101) and ground. The specialist understands how he may, using prior techniques, design a common terminal switching circuit (9) providing an open state when the receiving circuit (6) is in the activated state and a closed state when the transmitting circuit (5) is in the activated state.

Second Embodiment

Figure 5:
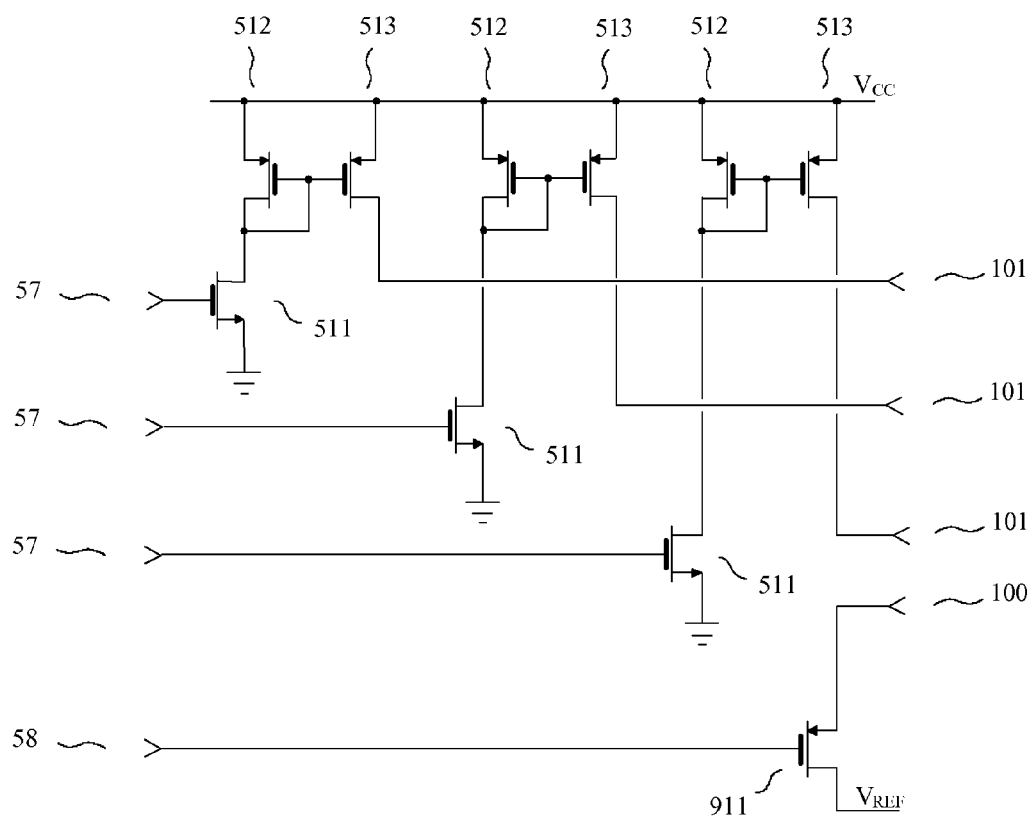
FIG. 5 shows a transmitting circuit and a common terminal switching circuit used in a second embodiment.
Figure 7:
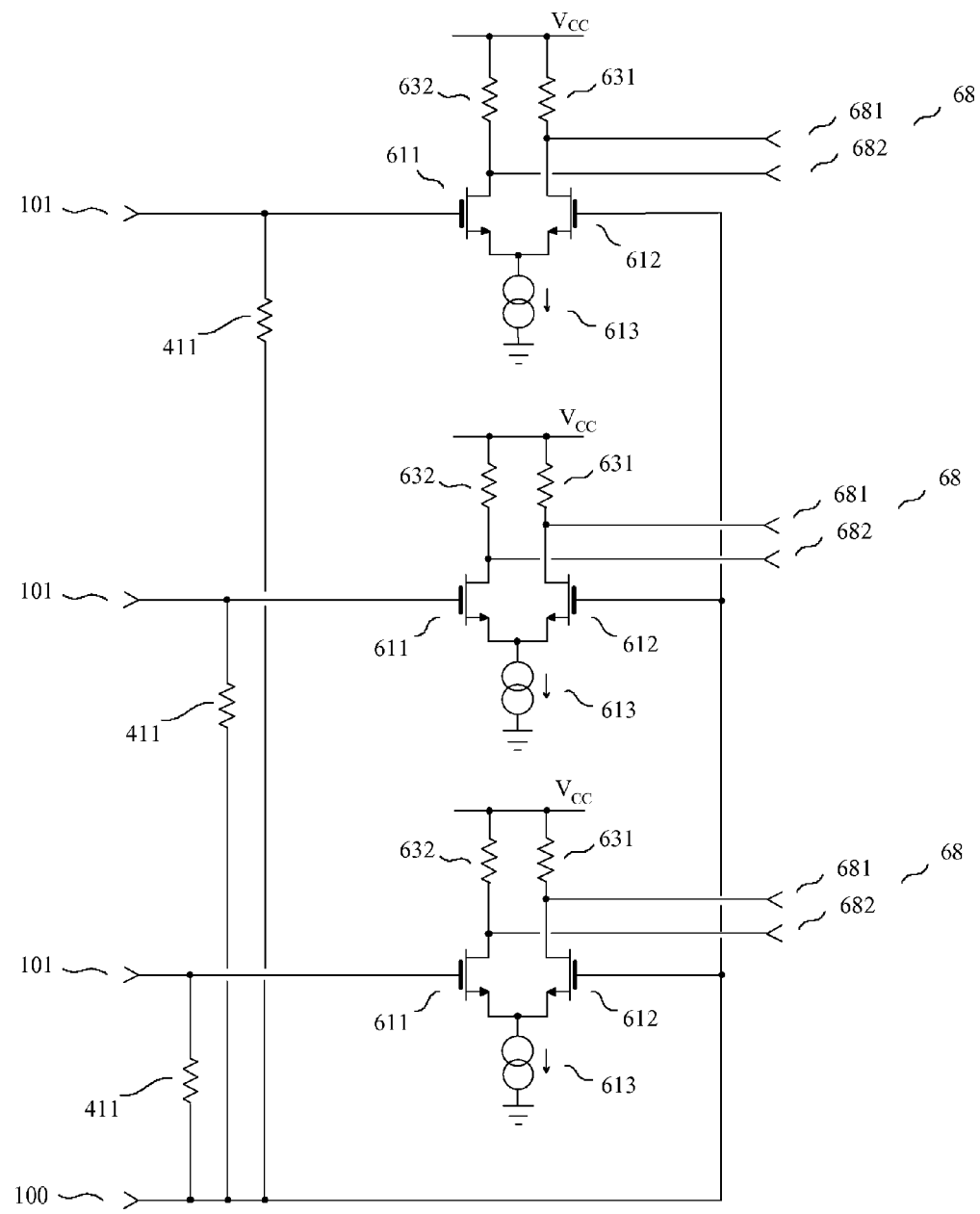
FIG. 7 shows a receiving circuit and a termination circuit used in the second embodiment.

The second embodiment of an interfacing device of the invention, given by way of non-limiting example, comprises:
the transmitting circuit and the common terminal switching circuit shown in FIG. 5;
the receiving circuit and the termination circuit shown in FIG. 7.

In the transmitting circuit and the common terminal switching circuit shown in FIG. 5:
each of the q=3 "input signals of the transmitting circuit" is applied to a signal input (57) which is of the single-ended input type;
each of the q=3 signal inputs (57) corresponds to a three-transistor cell made of an input transistor (511) and of a current mirror comprising two transistors (512) (513);
each of the m=3 signal terminals (101) is coupled to the drain of the output transistor (513) of the corresponding three-transistor cell;
the transmitting circuit is made of the three three-transistor cells, hence of 9 transistors (511) (512) (513);
a "common terminal switching signal" is applied to a control input (58) connected to the gate of a transistor (911);
the common terminal (100) is connected to the source of this transistor (911);
the common terminal switching circuit is made of this transistor (911) which may switch the common terminal (100) to a positive reference voltage $V_{REF}$.

Let us note that the sources of the input transistors (511) are grounded, the ground symbol used in FIG. 5 and in the following figures having exactly the same meaning as the other ground symbol used in the FIGS. 1 to 4.

The transmitting circuit shown in FIG. 5 delivers, when the biasing of the signal inputs (57) is appropriate, transmission variables, each transmission variable being a current flowing out of one of the signal terminals (101), each transmission variable being approximately determined by only one of the "input signals of the transmitting circuit", which is the voltage of one of the signal inputs (57). The specialist understands that applying a voltage near zero between each signal input (57) and ground deactivates the transmitting circuit shown in FIG. 5, and that in this case its output presents a high impedance.

The common terminal switching circuit shown in FIG. 5 comprises a transistor (911) which may be in the open state or in the closed state (ohmic regime). When the transmitting circuit is in the activated state, the "common terminal switching signal" applied to the control input (58) is low: the common terminal switching circuit is therefore in the closed state and the common terminal (100) is coupled to the reference voltage through a low impedance corresponding approximately to the parameter $r_{DS(on)}$ of the transistor. When the transmitting circuit is in the deactivated state, the "common terminal switching signal" applied to the control input (58) is high: the common terminal switching circuit is therefore in the open state and the common terminal (100) is no more coupled to the reference voltage.

In the receiving circuit and the termination circuit shown in FIG. 7:

- each of the p=3 "output signals of the receiving circuit" is delivered to an output (68) which is a differential output comprising 2 terminals (681) (682);
- each of the p outputs (68) corresponds to the output of a differential pair made of two transistors (611) (612) whose sources are biased by a current source (613) and whose drains are biased by two resistors (631) (632);
- each of the m=3 signal terminals (101) is connected to the gate of the first transistor (611) of one of said differential pairs;
- the common terminal (100) is connected to the gate of the p second transistors (612) of said differential pairs;
- the termination circuit is made of m resistors (411), each of these resistors being connected between a signal terminal (101) and the common terminal (100).

The specialist understands that the current sources (613) shown in FIG. 7 are ideal circuit elements which may be realized with real components, for instance using current mirrors. The specialist sees that the receiving circuit shown in FIG. 7 produces at its outputs p "output signals of the receiving circuit" corresponding each to one of the transmission channels, each of the "output signals of the receiving circuit" being determined by the voltage between one of said signal terminals (101) and said common terminal (100).

A good pseudo-differential reception requires a sufficiently high impedance between the common terminal (100) and the reference terminal. When the transmitting circuit of FIG. 5 is in the activated state, the receiving circuit of FIG. 7 is considered as in the deactivated state, because, the common terminal switching circuit shown in FIG. 5 being in the closed state, a good pseudo-differential reception is not possible (even with an hybrid circuit). When the transmitting circuit of FIG. 5 is in the deactivated state, the receiving circuit of FIG. 7 is considered as in the activated state, because, the common terminal switching circuit shown in FIG. 5 being in the open state, a good pseudo-differential reception is possible.

However, we note that, in this second embodiment, the outputs (68) of the receiving circuit do not present a high impedance when the receiving circuit is in the deactivated state.

In FIG. 7, if we neglect the gate currents of the transistors (611) (612) of the differential pairs, only the resistors (411) of the termination circuit produce currents in the signal terminals (101) and in the common terminal (100). The specialist sees that the circuits shown in FIG. 5 and in FIG. 7 are suitable for "the contemplated use" defined above.

The circuits shown in FIG. 5 are such that the common terminal switching circuit and the transmitting circuit are without parts in common. We note that, in FIG. 5, the transmitting circuit is not coupled to the common terminal (100). We also note that, in FIG. 5, when the transmitting circuit is in the activated state, the instantaneous current flowing out of each signal terminal (101) is positive and the instantaneous current flowing out of the common terminal (100) is negative. However, this is not a general characteristic of a device of the invention.

This second embodiment is appropriate for transmitting and receiving analog or digital signals.

Third Embodiment

Figure 6:
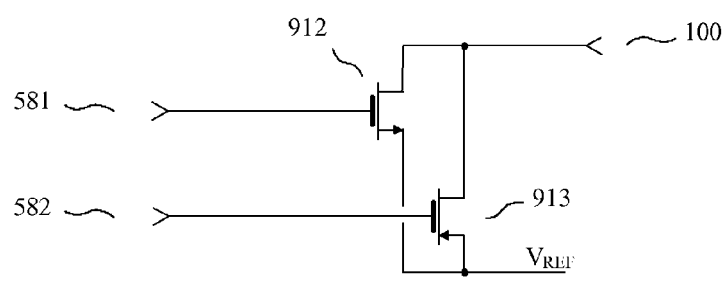
FIG. 6 shows a common terminal switching circuit used in a third embodiment.

The third embodiment of an interfacing device of the invention, given by way of non-limiting example, comprises the common terminal switching circuit shown in FIG. 6, consisting of an n-channel transistor (912) and of a p-channel transistor (913) the sources of which are connected to each other and the drains of which are connected to each other. The drains of the transistors (912) (913) are connected to the common terminal (100) and the sources of the transistors (912) (913) are grounded. This common terminal switching circuit is controlled by two control inputs: a first control input (581) for the "first common terminal switching signal" and a second control input (582) for the "second common terminal switching signal". The specialist sees that the two transistors (912) (913) form a CMOS switch and understands that the "source" and "drain" electrodes may be exchanged in FIG. 6, when the transistors are symmetrical.

When the "first common terminal switching signal" applied to the first control input (581) is low and the "second common terminal switching signal" applied to the second control input (582) is high, the n-channel transistor (912) and the p-channel transistor (913) are in the open state for a suitable biasing of the common terminal (100), and the common terminal switching circuit is considered as in the open state.

When the "first common terminal switching signal" applied to the first control input (581) is high and the "second common terminal switching signal" applied to the second control input (582) is low, the n-channel transistor (912) and the p-channel transistor (913) are in the closed state and the common terminal switching circuit is considered as in the closed state.

Fourth Embodiment

Figure 8:
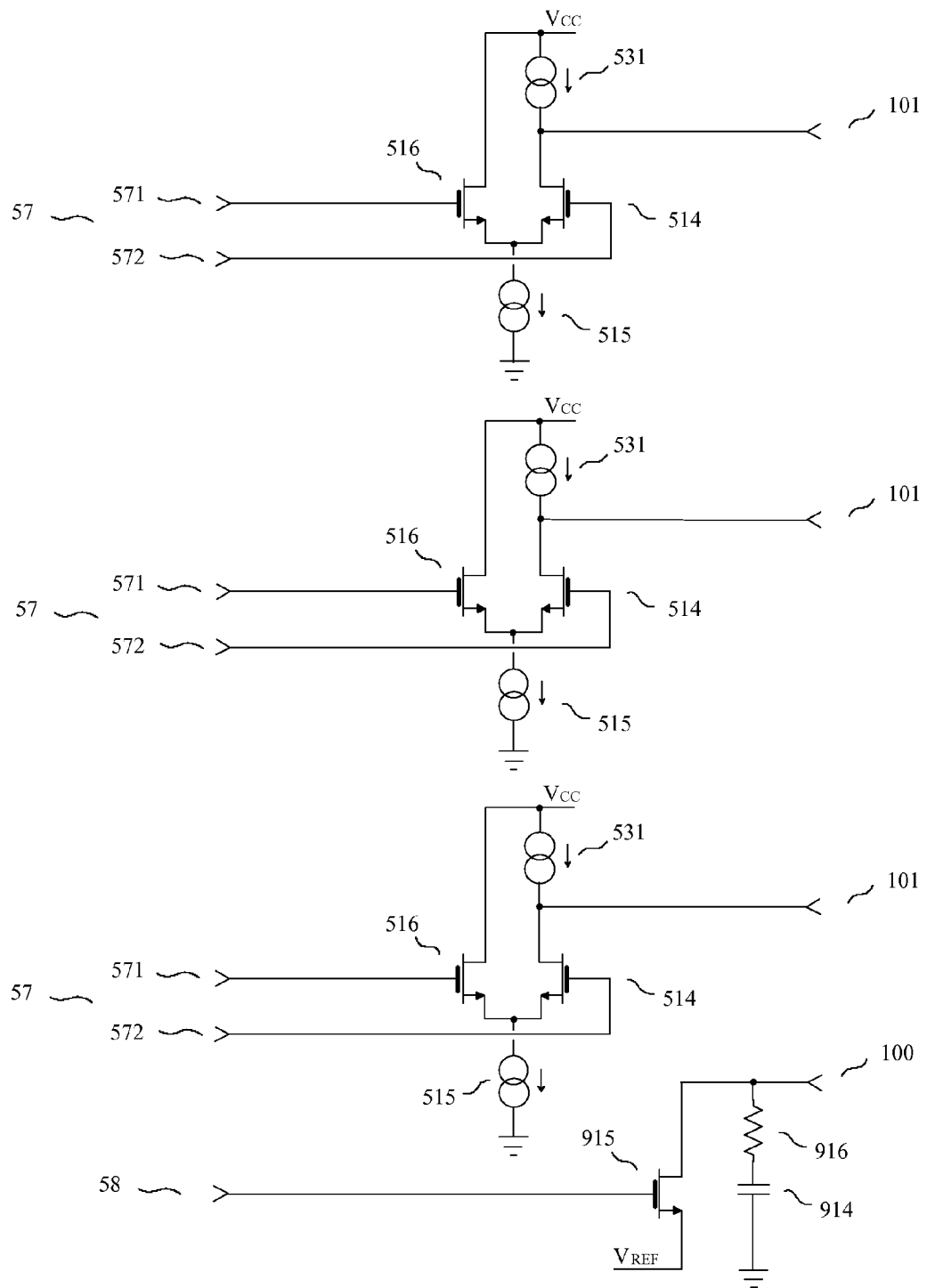
FIG. 8 shows a transmitting circuit and a common terminal switching circuit used in a fourth embodiment.

The fourth embodiment of an interfacing device of the invention, given by way of non-limiting example, comprises the transmitting circuit and the common terminal switching circuit shown in FIG. 8, in which:

- each of the q=3 "input signals of the transmitting circuit" is applied to a signal input (57) which is a differential input comprising 2 terminals (571) (572);
- each of the q=3 signal inputs (57) corresponds to the input of a differential pair made of two transistors (514) (516) whose sources are biased by a current source (515) supplying a practically constant current I;
- each of the m=3 signal terminals (101) is connected to the drain of the first transistor (514) of each of said differential pairs and to a current source (531) supplying a current approximating I/2 and practically constant;
- the transmitting circuit is made of the three differential pairs (514) (516) and of the six current sources (515) (531);
- a "common terminal switching signal" is applied to a control input (58) connected to the gate of a transistor (915);
- the common terminal (100) is connected to the drain of this transistor (915) and to a resistor (916) connected in series with a grounded capacitor (914);
- the common terminal switching circuit is made of this transistor (915), which may switch the common terminal (100) to a reference voltage $V_{REF}$, of said resistor (916) and of said capacitor (914).

The common terminal switching circuit shown in FIG. 8 comprises a transistor (915) which may be in the open state or in the closed state. When the transmitting circuit is in the activated state, the "common terminal switching signal" applied to the control input (58) is high, the common terminal switching circuit is therefore in the closed state and the common terminal (100) is coupled to the reference voltage through a low impedance. When the transmitting circuit is in the deactivated state, the "common terminal switching signal" applied to the control input (58) is low, the common terminal switching circuit is therefore in the open state and the common terminal (100) is no more coupled to the reference voltage. When the common terminal switching circuit is in the open state, the admittance $Y_{OFF}(v_{C\ BIAS}, f)$ is mainly determined by said resistor (916) and by said capacitor (914). When the receiving circuit (not shown in FIG. 8) is in the activated state, the transmitting circuit is in the deactivated state.

The specialist understands that the current sources (515) (531) shown in FIG. 8 are ideal circuit elements which may be realized with real components, for instance using current mirrors. The transmitting circuit shown in FIG. 8 delivers, when the transmitting circuit is in the activated state, transmission variables, each transmission variable being a current flowing out of one of the signal terminals (101), each transmission variable being approximately determined by one of the "input signals of the transmitting circuit". The specialist understands that it is easy to realize a circuit controlling the parameter I determining the current delivered by the current sources (515) (531), and that a low level of the "common terminal switching signal" may set this parameter to a value near zero. In this case, the transmitting circuit shown in FIG. 8 is not in the activated state and its output presents a high impedance.

We note that, in FIG. 8, when the transmitting circuit is in the activated state, the instantaneous current flowing out of each signal terminal (101) and the instantaneous current flowing out of the common terminal (100) may take on positive and/or negative values.

This fourth embodiment is appropriate for transmitting and receiving analog or digital signals.

Fifth Embodiment

The fifth embodiment of an interfacing device of the invention, given by way of non-limiting example, is intended for sending and receiving binary digital signals. It comprises the transmitting circuit and the common terminal switching circuit shown in FIG. 9, in which:
  each of the q=2 "input signals of the transmitting circuit" is applied to a signal input (57) which is a single-ended input;
  each of the q=2 signal inputs (57) is connected to an input of two logic gates (519) (520), the output of the first logic gate (519) being connected to an output transistor (517) the source of which is connected to a power supply conductor, the output of the second logic gate (520) being connected to an output transistor (518) the source of which is connected to ground;
  each of the m=2 signal terminals (101) is connected to the drains of these two output transistors (517) (518);
  a "common terminal switching signal" is applied to a control input (58) connected to the input of an inverter (901) and acts on said logic gates (519) (520), in such a way that the drains of said output transistors (517) (518) present a high impedance when the "common terminal switching signal" is low, and in such a way that the drain voltage of the output transistors (517) (518) connected to a given signal terminal (101) follows the corresponding "input signal of the transmitting circuit", when the "common terminal switching signal" is high;
  the common terminal (100) is connected to the sources of the output transistors (906) (907) of a device comprising six transistors (902) (903) (904) (905) (906) (907) and two current sources (908) (909), this device being proportioned in such a way that the sources of its output transistors (906) (907) present a high impedance when the "common terminal switching signal" is low, and in such a way that the sources of its output transistors (906) (907) deliver a voltage approximating a given reference voltage $V_{REF}$ when the "common terminal switching signal" is high;
  the common terminal switching circuit is made of said inverter (901) and of said device comprising six transistors (902) (903) (904) (905) (906) (907) and two current sources (908) (909), the transmitting circuit being composed of the other components shown in FIG. 9.

Figure 9:
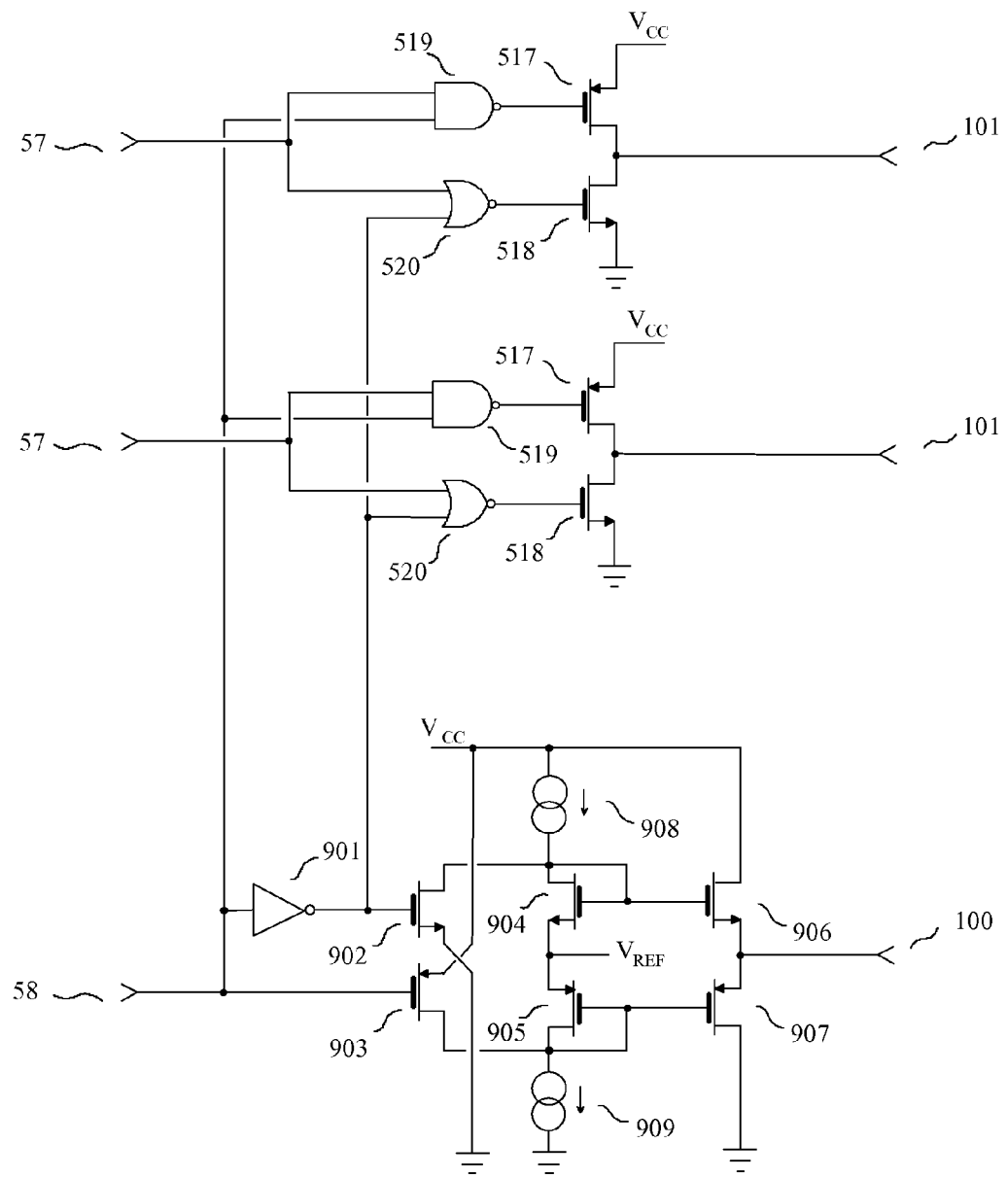
FIG. 9 shows a transmitting circuit and a common terminal switching circuit used in a fifth embodiment.

The transmitting circuit shown in FIG. 9 delivers, when the transmitting circuit is in the activated state, transmission variables, each transmission variable being a voltage between one of said signal terminals (101) and the reference terminal (ground), each transmission variable being approximately determined by one and only one of the "input signals of the transmitting circuit". It is clear for the specialist that the circuits shown in FIG. 9 are suitable for "the contemplated use" defined above.

The circuits shown in FIG. 9 are defined in such a way that the common terminal switching circuit and the transmitting circuit are without part in common. However, it is clear that the inverter (901), defined as being part of the common terminal switching circuit, is necessary to the operation of the transmitting circuit. Consequently, it would also be possible to consider that the common terminal switching circuit and the transmitting circuit have parts in common.

We note that, in FIG. 9, when the transmitting circuit is in the activated state, the instantaneous current flowing out of each signal terminal (101) and the instantaneous current flowing out of the common terminal (100) may take on positive and/or negative values.

In this fifth embodiment, the interfacing device of the invention also comprises a receiving circuit (not shown in FIG. 9), which may be of any suitable known type of pseudo-differential receiver for digital signals, for instance one of the pseudo-differential receivers described in said patents of the U.S. Pat. No. 5,994,925 and U.S. Pat. No. 7,099,395.

Sixth Embodiment

The sixth embodiment of an interfacing device of the invention, given by way of non-limiting example, is an example of a device of the invention using an alternating current (ac) coupling to the interconnection. The sixth embodiment of an interfacing device of the invention comprises the transmitting circuit and the common terminal switching circuit shown in FIG. 10, which are identical to the one shown in FIG. 9 except two differences:
  in FIG. 10, each of the m=2 signal terminals (101) is coupled to the drains of the two corresponding output transistors (517) (518), through a capacitor (521), instead of a direct connection in FIG. 9;
  in FIG. 10, the common terminal (100) is coupled to the sources of the two corresponding output transistors (906) (907), through a capacitor (920), instead of a direct connection in FIG. 9.

Figure 10:
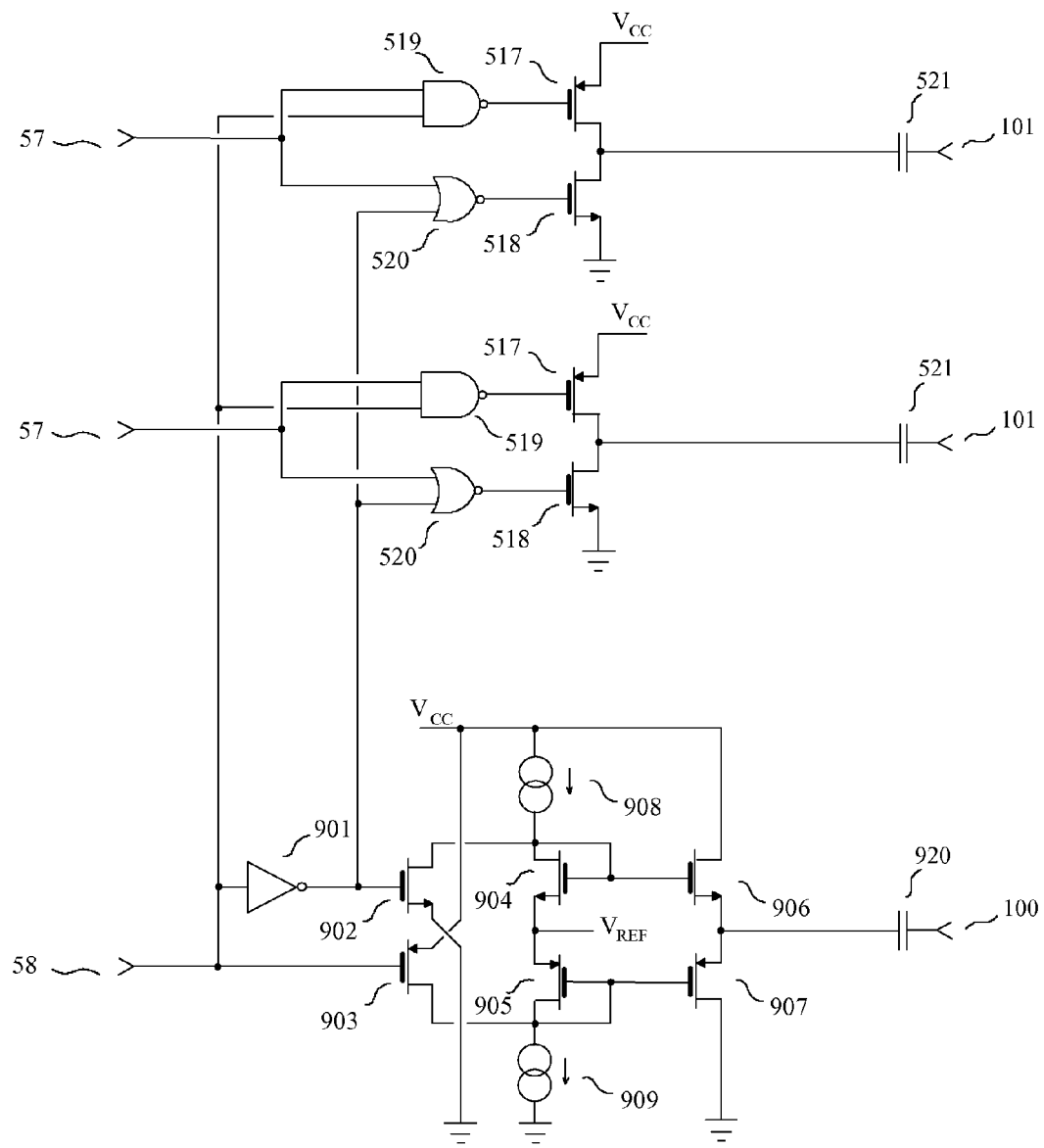
FIG. 10 shows a transmitting circuit and a common terminal switching circuit used in a sixth embodiment.

The transmitting circuit shown in FIG. 10 delivers, when the transmitting circuit is in the activated state, transmission variables, each transmission variable being a voltage between one of said signal terminals (101) and the reference terminal (ground), each transmission variable being approximately determined by one and only one of the "input signals of the transmitting circuit". The transmission variables use the frequencies ranging from to 1 MHz to 2 GHz. In this frequency band, the common terminal switching circuit in the closed state presents a "low" impedance between the common terminal (100) and ground, and the common terminal switching circuit in the open state presents a "high" impedance between the common terminal (100) and ground.

Indications On Industrial Applications

The interfacing device of the invention is suitable for pseudo-differential transmission between integrated circuits through an interconnection having two or more transmission conductors, the transmission presenting reduced unwanted couplings.

We note that, in the embodiments of an interfacing device of the invention, given above by way of non-limiting examples and shown in FIGS. 5 to 10, the active components are MOSFETs. This is not at all a characteristic of the invention, and specialists understand that it would have also been possible to use bipolar transistors or other types of active components. Consequently, the interfacing device of the invention may be implemented in integrated circuits made using any applicable manufacturing process.

The invention is suitable for the protection against the noise produced by unwanted electromagnetic couplings in printed circuit boards. The invention is particularly advantageous to printed circuit boards comprising wide-band analog circuits or fast digital circuits. For sending in q transmission channels, the invention has the advantage of only requiring q+1 pins on an integrated circuit providing the functions of the transmitting circuit, of the receiving circuit and of the common terminal switching circuit, as opposed to 2q pins in the case of a transceiver for differential transmission.

The interfacing device of the invention is particularly suitable for pseudo-differential transmission inside an integrated circuit, because it provides a good protection against the noise related to the currents flowing in the reference conductor and in the substrate of the integrated circuit.

An interfacing device of the invention may be built inside an integrated circuit, but this is not at all a characteristic of the invention. For instance, it could be interesting that the transmitting circuit, the receiving circuit and the common terminal switching circuit be built inside an integrated circuit, a termination circuit being built outside this integrated circuit.

Since the invention includes the possibility of a deactivated state for the terminals intended to be connected to said interconnection, for instance a high impedance state, the invention is suitable for an implementation in a data bus architecture.

The invention is particularly suitable for multilevel signaling, because this type of transmission scheme is more sensitive to noise than binary signaling.

The invention claimed is:

1. A device for transmitting signals through a plurality of transmission channels, in a known frequency band, comprising:
m signal terminals, a common terminal and a reference terminal, the signal terminals and the common terminal being configured to be connected to an interconnection having at least m+1 conductors, m being an integer greater than or equal to 2;
a receiving circuit delivering, when the receiving circuit is in the activated state, p output signals of the receiving circuit corresponding each to a transmission channel, p being an integer greater than or equal to 1 and less than or equal to m, the input of the receiving circuit being coupled to at least p of the signal terminals and to the common terminal, each of the output signals of the receiving circuit being mainly determined by the voltage between one and only one of the signal terminals and the common terminal;
a transmitting circuit receiving q input signals of the transmitting circuit corresponding each to a transmission channel, q being an integer greater than or equal to 2 and less than or equal to m, the output of the transmitting circuit being coupled to at least q of the signal terminals, the output of the transmitting circuit delivering, when the transmitting circuit is in the activated state, q transmission variables, each transmission variable being either a voltage between one of the signal terminals and the reference terminal or a current flowing out of one of the signal terminals, each transmission variable being mainly determined by one and only one of the input signals of the transmitting circuit; and
a common terminal switching circuit having an open state and a closed state, the common terminal switching circuit having a return current terminal connected to the common terminal, the common terminal switching circuit being in the closed state when the transmitting circuit is in the activated state, the common terminal switching circuit being in the open state when the receiving circuit is in the activated state, the common terminal switching circuit in the closed state providing, between the common terminal and the reference terminal, a voltage approximately equal to the sum of a constant voltage and of the voltage, determined using the active sign convention, which would appear across a first passive two-terminal circuit element subject to the current flowing from the return current terminal to the common terminal.

2. The device of claim 1, wherein the common terminal switching circuit in the open state provides a current flowing from the return current terminal to the common terminal approximately equal to the sum of a constant current and of the current flowing out of a second passive two-terminal circuit element subject to the voltage between the common terminal and the reference terminal, and wherein the product of the absolute value of the small-signal impedance of the first passive two-terminal circuit element, at a first quiescent operating point, by the absolute value of the small-signal admittance of the second passive two-terminal circuit element, at a second quiescent operating point, is, in at least a part of the known frequency band, less than or equal to ½.

3. The device of claim 1, wherein the common terminal switching circuit in the closed state is such that, at the first quiescent operating point, the first passive two-terminal circuit element has a small-signal impedance having, in the known frequency band, an absolute value less than or equal to three hundred ohms.

4. The device of claim 1, wherein the relationship between the current flowing out of the return current terminal and the voltage between the common terminal and the reference terminal is linear when the common terminal switching circuit is in the closed state and/or when the common terminal switching circuit is in the open state.

5. The device of claim 1, wherein the small-signal impedance of the first passive two-terminal circuit element can be adjusted by electrical means.

6. The device of claim 2, wherein the small-signal admittance of the second passive two-terminal circuit element can be adjusted by electrical means.

7. The device of claim 1, wherein the device constitutes a part of an integrated circuit, the interconnection being realized inside the integrated circuit.

8. The device of claim 1, wherein the device constitutes a part of an integrated circuit, each of the m signal terminals being coupled to one or more pins of the integrated circuit, the common terminal being coupled to one or more pins of the integrated circuit.

9. The device of claim 1, further comprising a termination circuit coupled to each of the signal terminals and to the common terminal, the termination circuit being, when the termination circuit is in the activated state, for the signal terminals and the common terminal, approximately equivalent to a network consisting of m branches, each of the branches having a first terminal and a second terminal, each of the branches consisting of a passive linear two-terminal circuit element connected in series with a voltage source delivering a constant voltage, the first terminal of each of the branches being connected to one and only one of the signal terminals, the second terminal of each of the branches being connected to the common terminal, each of the signal terminals being connected to the first terminal of one and only one of the branches.

10. The device of claim 9, wherein the impedance matrix, with respect to the common terminal, of the termination circuit in the activated state can be adjusted by electrical means.

11. The device of claim 9, wherein the termination circuit has an activated state and a deactivated state, each current flowing from the termination circuit to one of the signal terminals being substantially zero when the termination circuit is in the deactivated state.

* * * * *